Oct. 20, 1931.                C. FÖHL                1,828,528
POWER PLANT
Filed Oct. 30, 1929
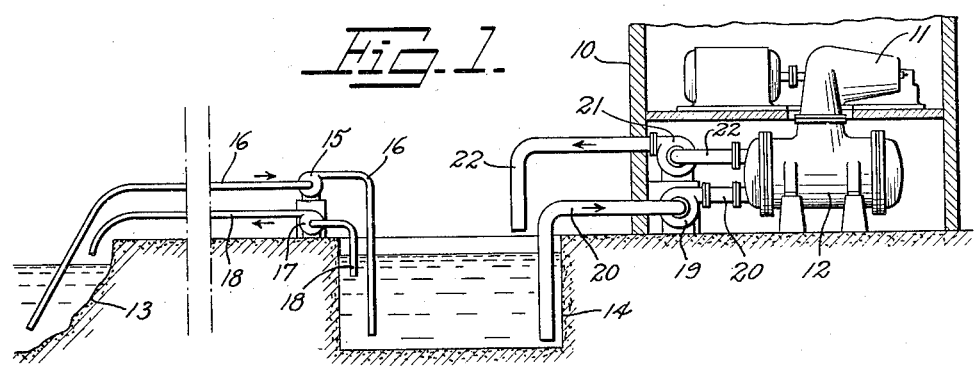
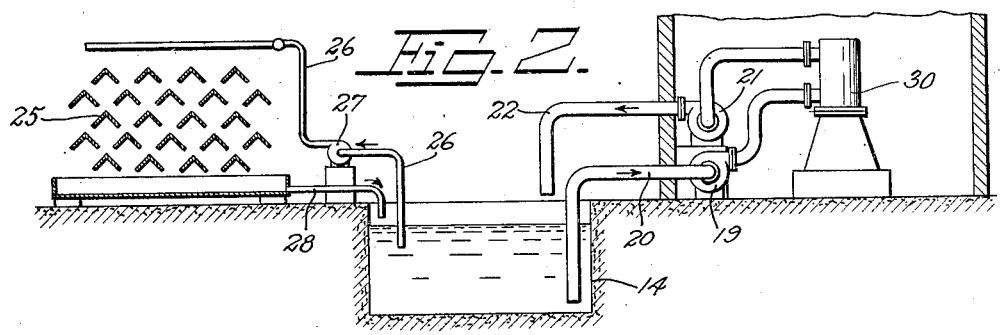
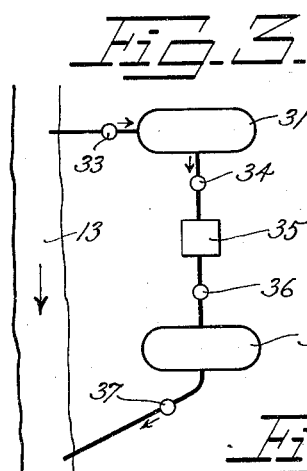
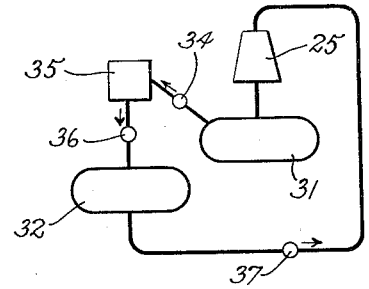
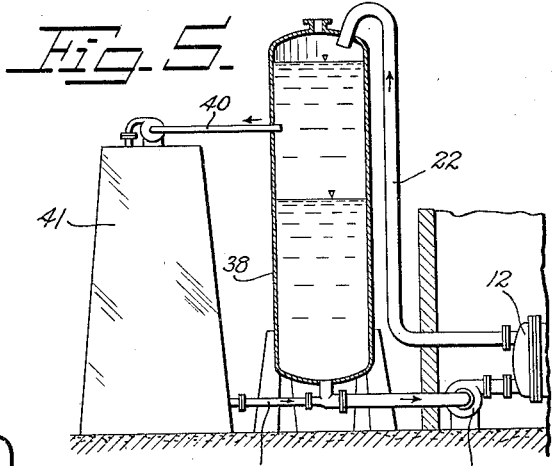
INVENTOR
Carl Föhl
BY
N. J. Hedlund
his ATTORNEY Patented Oct. 20, 1931

1,828,528

UNITED STATES PATENT OFFICE

CARL FÖHL, OF BERLIN, GERMANY, ASSIGNOR TO RUTHSACCUMULATOR AKTIEBOLAG, OF BERLIN, GERMANY, A CORPORATION OF SWEDEN

POWER PLANT

Application filed October 30, 1929, Serial No. 403,433, and in Germany November 13, 1928.

My invention relates to power plants and particularly to power plants which utilize water for cooling purposes as for cooling steam condensers or the jackets of Diesel engines. Still more particularly, my invention relates to plants of the kind operating to take care of sudden demands for power for a short period. Such plants may be peak load plants or stand-by plants. A stand-by plant is one which is held in readiness to give power but which normally is not in operation. A peak load plant is one which takes the proportion of a heavy load above that given by continuously or substantially continuously operating machinery. Plants of this type are designed to give a great amount of power in a short time. In order to give out power, cooling water is usually necessary. Plants of this kind require a high rate of supply of cooling water for the period when they are in operation. To illustrate, the amount of cooling water required in the average condenser is more than sixty times as much by weight as the amount of steam condensed. Since such plants use an enormous amount of steam for a short period, it will be evident that they must have a very great amount of cooling water.

To place such a plant geographically so that it has a sufficient amount of water to draw on from a nearby source is often difficult. The availability of natural water is a limiting factor for stand-by plants and the like. Sometimes it is difficult to find a location for a plant, particularly a stand-by plant, which is near to the place where the power is needed and at the same time has a cooling water source of supply of sufficient magnitude. Usually such plants are moved to the source of cooling water which is nearest and which is of sufficient magnitude. This often involves construction of long electric transmission lines, the cost of which is appreciable. While such electric lines are economically feasible for plants operating continuously, the cost may be an appreciable factor in connection with stand-by plants and the like.

The present invention has for its object to avoid these difficulties and permit an independence between a stand-by plant or peak load plant and a source of water supply. By means of the present invention it is possible to use sources of supply which would not otherwise be usable and even to operate without recourse to natural water supplies.

I propose to accumulate cold water over a long period when the stand-by or peak load plant is not in operation. The accumulated water is such as to provide a sufficient quantity for use when the demand for power comes on the plant. This can be accomplished in a variety of ways as will hereinafter be described.

The invention, the nature thereof, objects thereof, apparatus for carrying out the same, and methods of operation incident thereto will become evident from a consideration of the following specification taken in conjunction with the accompanying drawings showing, diagrammatically, structures for carrying out the invention, which drawings are to be considered as a part of the specification.

On the drawings:

Fig. 1 shows diagrammatically a power plant comprising a condenser and embodying the invention;

Fig. 2 shows a power plant comprising one or more Diesel engines and embodying the invention;

Fig. 3 shows another arrangement embodying the invention;

Fig. 4 is still another plant arrangement embodying the invention; and

Fig. 5 is still another embodiment of the invention.

Referring more particularly to Fig. 1, reference character 10 designates a power house in which is a turbine 11 supplied with steam from any suitable source. The turbine discharges steam into a condenser 12. The condenser is equipped with the usual cooling pipes and connections for flow of water through the cooling pipes to condense the steam.

Reference character 13 designates a natural water course such as a river or the sea. A reservoir 14 is constructed adjacent to the power house. As indicated, this reservoir may be constructed in the ground. The reservoir is to be considered as at any remote distance from the water course 13. A pump 15 pumps water through conduit 16 from the water course into reservoir 14. A pump 17 is provided for pumping water through conduit 18 from the reservoir into the water course. A pump 19 is provided for pumping water through conduit 20 from reservoir 14 to the condenser. A pump 21 pumps water through conduit 22 from the condenser into reservoir 14. One or more of the pumps may be unnecessary on account of the relative elevations of the condenser, the reservoir and the water course.

Assume that the power house supplies power only for a period of two hours during a day, let us say, from 5:00 to 7:00 p. m. During the whole twenty-four hours pump 15 will be in operation to supply cold water to reservoir 14. When demand for power comes on the power house, a large quantity of cold water has been stored in the reservoir and the cold water can be pumped through the condenser at a high rate. When the peak load is over and the condenser is no longer operating, pump 17 may draw warm water discharged from the condenser and send it back to the water course, thus causing a circulation which will cool the water in reservoir 14. In many cases the return line 18 may be omitted since the atmosphere will sufficiently cool the water in reservoir 14 so as not to adversely affect the operation of the power apparatus. Obviously, suitable regulation may be applied to control the level of water in the reservoir and the rate of flow through the pumps and the withdrawal of water from the reservoir.

It will be seen that this arrangement is particularly advantageous where the water course has a small capacity. If the water stream is of slow flow and the condenser were direct connected to receive water from the stream, it might drain the stream very quickly. By my invention, the power apparatus has a cold water supply exceeding by many times the capacity of the water course.

It will be seen that the pipe lines 16 and 18 can be of small diameter because the rate of flow is much slower through these pipe lines than through pipes 20 and 22. A very small pipe will take care of a large plant wherefore the cost is not high.

Fig. 2 shows an arrangement wherein a natural water course is not used but the water of the reservoir 14 is cooled by circulating it through a cooling tower. The cooling tower is designated at 25. During the whole twenty-four hours, water is drawn at a relatively slow rate through pipe 26 by pump 27 and caused to be cooled by air in the cooling tower. The water then returns through pipe 28 to reservoir 14. In Fig. 2 I have shown the cooling water as being utilized for cooling a Diesel engine 30, though it will be understood that the element which is cooled in Fig. 1 may be a Diesel engine or other machine or apparatus and that the element which is cooled in Fig. 2 may be a condenser or other machine or apparatus. Likewise in this case, the size of conduits 26 and 28 need not be great. By means of my invention, the cooling effect for the Diesel engine jackets or for the condenser is distributed over a great period of time, although the demand for power is of short duration.

In order to avoid the heating of the reservoir water by the discharge of hot water thereinto, I propose, as shown in Fig. 3, to provide two reservoirs 31 and 32. Pump 33 draws cooling water from the water course 13 and this water is accumulated in reservoir 31. When demand for power is present, pump 34 pumps water into the member 35 to be cooled. The hot water is discharged by means of pump 36 into a reservoir 32, where it is held for a while until the demand for power is over. The water is then pumped by means of pump 37 back into the water course. As in the previous embodiments, one or more of the pumps may be omitted by suitably arranging the elevations of the respective pieces of apparati. This arrangement has the advantage that the hot water is not thrown back into the water course so that it will pass back through pump 33 while there is a demand for power. This obviously is particularly advantageous with a water course having a slow flow.

The arrangement of Fig. 4 is similar to the arrangement of Fig. 3 except that the water cooling tower 25 is interposed between reservoir 32 and reservoir 31 in the pipe line containing the pump 37. This arrangement has the advantages brought forth in connection with the Fig. 2 embodiment and in addition has the advantage that the hot water does not mix with the cold water.

The preventing of mixing may be accomplished in the same reservoir as shown in Fig. 5 by having the cold water enter the bottom of the reservoir, indicated at 38. Pump 39 pumps cold water through the condenser 12 when there is a demand for power and the hot water passes through conduit 22 into the top part of the reservoir 38. The hot water stays on top of the cold water. Hot water is withdrawn through conduit 40 and passes through a cooling device 41 and is returned through conduit 42 to the reservoir.

It will be understood that the invention is not limited to the arrangements shown and described.

What I claim is:

1. Power plant apparatus of the kind operating to take care of sudden demands for power for a short period comprising a member requiring cooling, water holding means having sufficient capacity to store enough water to cool said member during the aforesaid short period, means for conducting water from said water holding means to said member and from said member to said water holding means, means for continuously withdrawing heated water from said water holding means and means for continuously supplying said water holding means with cold water.

2. Power plant apparatus of the kind operating to take care of sudden demands for power for a short period and utilizing water from a natural water course for cooling comprising a member requiring cooling, water holding means having sufficient capacity to store enough water to cool said member during the aforesaid short period, means for conducting water from said water holding means to said member and from said member to said water holding means, means for continuously conducting heated water from said water holding means to the natural water course and means for continuously conducting water from the natural water course to said water holding means.

3. Power plant apparatus of the kind operating to take care of sudden demands for power for a short period and utilizing water from a natural water course for cooling comprising a member requiring cooling, water holding means comprising a plurality of reservoirs, each of said reservoirs having sufficient capacity to store enough water to cool said member during the aforesaid short period, means for continuously conducting water from the natural water course to one of said reservoirs, means for conducting water from said one of said reservoirs to said member, means for conducting water from said member to another of said reservoirs and means for continuously conducting water from said another of said reservoirs to the natural water course.

4. Power plant apparatus of the kind operating to take care of sudden demands for power for a short period and utilizing water from a natural water course for cooling comprising a member requiring cooling, water holding means comprising two reservoirs, each of said reservoirs having sufficient capacity to store enough water to cool said member during the aforesaid short period, means for continuously conducting water from the natural water course to one of said reservoirs, means for conducting water from said one of said reservoirs to said member, means for conducting water from said member to the other of said reservoirs and means for continuously conducting water from said other of said reservoirs to the natural water course.

5. Power plant apparatus of the kind operating to take care of demands for power for a short period comprising a member requiring cooling, a water holding means having sufficient capacity to store enough water to cool said member during the aforesaid short period, means for conducting a relatively large quantity of water per unit of time from said water holding means to said member and from said member to said water holding means, means for withdrawing a relatively small quantity of heated water per unit of time from said water holding means and means for supplying said water holding means with a relatively small quantity of cold water per unit of time.

In testimony whereof I have hereunto affixed my signature.

CARL FÖHL.